United States Patent [19]

Gardner

[11] 3,910,334
[45] Oct. 7, 1975

[54] PNEUMATIC TIRE-RIM COMBINATION WITH RUN-FLAT CAPABILITIES

[75] Inventor: James Dennis Gardner, Akron, Ohio

[73] Assignee: The Firestone Tire & Rubber Company, Akron, Ohio

[22] Filed: May 3, 1974

[21] Appl. No.: 466,578

[52] U.S. Cl. ......... 152/330 L; 152/347; 152/330 RF
[51] Int. Cl.² .......................................... B60C 5/00
[58] Field of Search ...... 152/330 L, 330 RF, 330 R, 152/346, 347; 252/10, 11; 184/112

[56] References Cited
UNITED STATES PATENTS

| | | | |
|---|---|---|---|
| 3,444,918 | 5/1969 | Goggins | 152/330 L |
| 3,513,943 | 5/1970 | Ernst | 184/1 R |
| 3,540,510 | 11/1970 | Smithkey | 152/330 RF |
| 3,739,829 | 6/1973 | Powell et al. | 152/330 RF |
| 3,779,942 | 12/1973 | Bolles | 252/10 X |

*Primary Examiner*—Drayton E. Hoffman
*Assistant Examiner*—Larry H. Martin

[57] ABSTRACT

This disclosure relates to a pneumatic tire-rim construction which has excellent run-flat characteristics which enables the tire to be run-flat on the rim without destroying the remaining useful life of the tire. The construction comprises providing the tire-rim combination with thin-walled capsules containing a lubricant-sealant material in the tire's inflation chamber. These capsules are crushed when the tire is run un-inflated, thereby releasing the lubricant-sealant material into the inflation chamber of the tire. This material decreases the friction between the contacting surfaces of the tire when it is run un-inflated, thereby preventing any frictional damage to the tire.

2 Claims, 3 Drawing Figures

U.S. Patent  Oct. 7,1975  3,910,334
FIG. 1
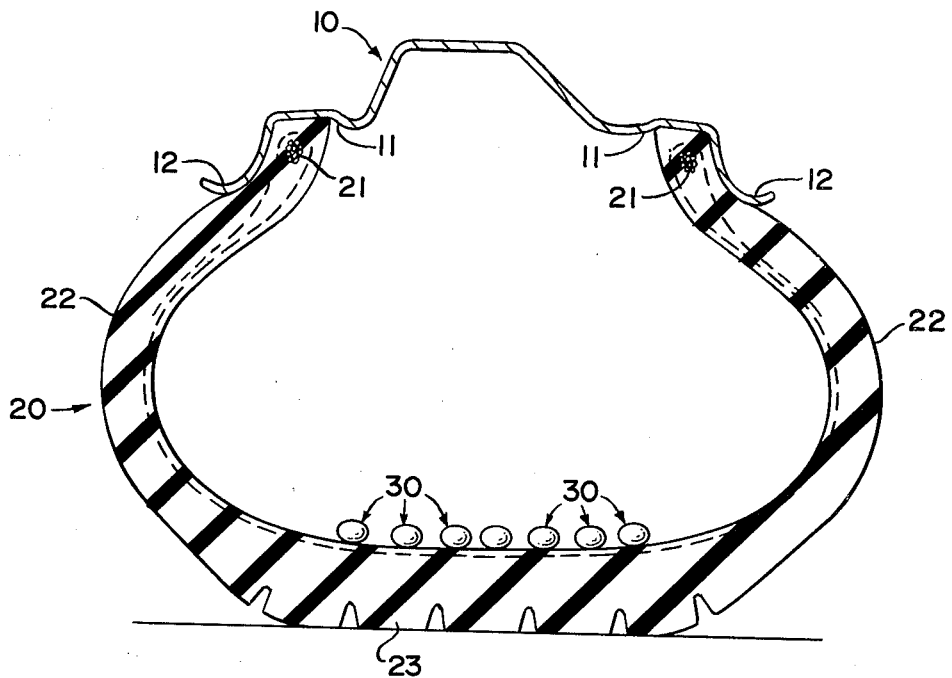
FIG. 2
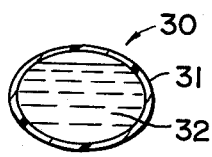
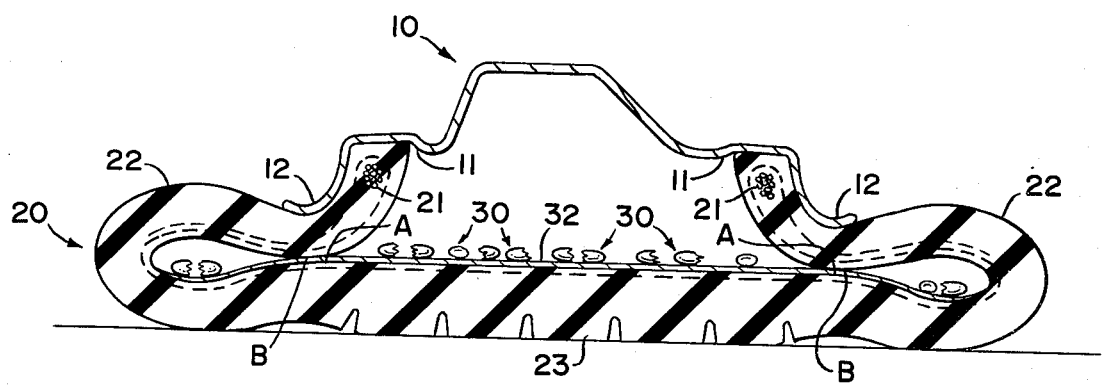
FIG. 3

PNEUMATIC TIRE-RIM COMBINATION WITH RUN-FLAT CAPABILITIES

BACKGROUND OF THE INVENTION AND PRIOR ART

There is increasing emphasis on providing a pneumatic tire with the capability of being run-flat without destroying the remaining useful life of the tire. This emphasis is generated by the present pressure to economize on all of our raw materials and products and to eliminate any wasteful use of our natural resources. A companion pressure to this paramount conservation viewpoint is the present plan of automobile manufacturers to eliminate the spare tire in automobiles. Therefore, the capability of a tire to be run un-inflated (run-flat) for a certain number of miles at a certain speed without destroying the remaining useful life of the tire has attained new commercial importance.

Prior work has disclosed the concept of providing a tire with a lubricant-material in its inflation chamber so that the frictional destruction of the tire will be lessened when the tire is run-flat. The lubricant material coats the surfaces of the inner periphery or "band ply" of the tire which come into contact when the tire is run-flat. This coating lessens the frictional heat of the tire. Representative prior art which discloses this concept are U.S. Pat. Nos. 3,610,308 and 3,739,829.

Several constructions and methods have been disclosed to place a lubricant or sealant type material in the inflation chamber of the tire. These constructions have been directed to preserving the lubricant-sealant while the tire is being run under standard conditions yet having the material readily available in the proper location when the tire is deflated. The art in the method of providing the tire with the lubricant-sealant material has progressed over the years. The initial art disclosed merely placing the sealant material in the inflation chamber of the tire. The art progressed to where the sealant was enclosed in pockets formed in the band ply or inner periphery of the tire (see U.S. Pat. Nos. 2,712,847; 3,444,918 and 3,563,294). The art also disclosed layers of sealant on the inner periphery of the tire between layers of vulcanized rubber (see U.S. Pat. No. 3,048,509). The art disclosed the use of a lubricant on the inner periphery of the tire by coating the inner periphery therewith (see U.S. Pat. Nos. 2,040,645; 3,610,308 and 3,739,829) or by having the lubricant ooze out of the rubber compound on the inner periphery of the tire (see U.S. Pat. No. 2,987,093). All of these prior art methods have drawbacks either from the standpoint that they are expensive to manufacture or that they lose their effectiveness after having been in a tire for a long period of time or that they are totally ineffective.

The Applicant in the construction and method of this invention has overcome these drawbacks in the prior art. It is an object of this invention to provide an economical tire-rim construction with a lubricant-sealant in the inflation chamber of the tire.

It is a further object of this invention to have the lubricant-sealant available and operative over extended periods of time. It is yet a further object of this invention to have the lubricant situated in the tire at the areas which will be rubbing against each other when the tire is run flat.

SUMMARY OF THE INVENTION

The Applicant has accomplished the objectives set out above by providing the tire with capsules containing the lubricant-sealant material. These capsules are comprised of a thin-walled shell which defines a chamber to contain the lubricant-sealant. Several of these capsules are placed in the air inflation chamber defined by the tire and rim prior to mounting the tire on the rim. After the tire is mounted on the rim, the capsules rest on the inner periphery of the tire in the area in which the tire contacts the road. When the tire is in operation, the capsules will be distributed about the tire due to the centrifugal forces acting upon the capsules. This eliminates any irregular ride or balance problem with the concept of this invention.

When the tire is deflated for any reason and is run-flat, the thin walls of the capsules will be crushed by the tire's own weight, thereby releasing the lubricant-sealant material. This material is then available to lubricate the areas of the tire that are rubbing on one another and eliminates a great deal of the friction and the destruction that would occur to the tire if this material was not present.

The lubricant-sealant material is not damaged by extensive lengths of time in the tire due to the fact that it is contained within the capsule and is not subjected to the degrading conditions that it otherwise would be, if it were merely lying on the inner periphery of the tire. The construction of this invention has the advantages of the prior art constructions in which the sealant material is contained in chambers within the inner periphery of the tire in that the integrity of the material is maintained during long exposures of tire usage; but has the advantage over these prior constructions in that the construction of this invention is very economic to manufacture as compared to these prior art constructions.

The construction of this invention has the further advantage over the prior art chamber type constructions in that the effectiveness of the construction is not lost after one use. It is envisioned that when capsules are used, the operator has merely to break the seal of the tire and rim and can add new capsules which will perform in the same manner as the prior ones.

DETAILS OF THE INVENTION

FIG. 1 is a cross-sectional view of a tire-rim-capsule combination exhibiting the combination of this invention;

FIG. 2 is a cross-sectional view of an example of the lubricant-sealant capsules of this invention;

FIG. 3 is a cross-sectional view of a tire-rim-capsule combination of this invention in which the tire has run flat and the capsules have broken to yield the lubricant-sealant material.

Referring to FIG. 1, the tire construction of this invention is depicted in its condition in the footprint area where the tread contacts the road surface. The tire 20 is shown mounted on rim 10. The rim 10 is shown as having safety ridges 11 axially inwardly of each of the tire beads 21. These safety ridges are helpful in maintaining the tire beads, 21, in a fixed position when the tire is run flat. The rim is additionally depicted as having extra-wide rim flanges which extend out in a direction substantially parallel to the axis of rotation of the tire. These rim flanges help to support the lower sidewall area of the tire when it is run flat. It is understood that the construction of this invention may also be mounted on a rim having standard configuration and features.

The tire 20 contains beads 21, sidewalls 22 and the road-engaging tread surface, 23. The tire may be of either the radial body type, the bias cord body type or the beltedbias body type. The tire may have any of the standard, known commercial cross-sectional shapes; however, it has been found that tires having short sidewall lengths (low aspect ratios) which are mounted on rims having rim widths less than the tire's tread width have better run-flat characteristics and are less susceptible to damage when being run-flat. Tires of this preferred type usually have aspect ratios less than 70%; that is, the maximum section height of the tire is less than 70% of the maximum section width of the tire.

The tire-rim combination shown in FIG. 1 contains capsules 30 located in the inflation chamber of the combination which are free to ride on the inner periphery or band ply of the tire. These capsules are more definitely defined in FIG. 2.

In FIG. 2 the capsule 30 comprises a thin-wall, 31, which completely encompasses the lubricant-sealant material 32. The thin walls of the capsule may be any material which is fragile and may be any of the known types of plastics or rubbers. The material must be of such a nature that it will break when subjected to minimal forces yet must be strong enough to withstand the centrifugal forces and the resulting bumping and abrading that would occur when a tire containing these capsules is run. FIG. 2 depicts the shape of the capsule to be oval. It is understood the capsule may be any shape which permits it to ride freely on the inner periphery of the tire.

The lubricant-sealant material contained in the capsules may be any of the standard materials utilized for this application. Such materials may be silicone-based oils or substances, various types of other oils such as castor oil, graphite-based materials, liquid polymeric materials, and asbestos or fibrous type materials. Preferably, water soluble type materials, such as glycols, glycerines and soaps, may be used. The water soluble types are preferred because of their ease of removal from the tire after use. They also do not interfere with any potential repairs of the tire as the other types may.

It is also contemplated that different capsules may contain different substances, that is, some may contain only lubricant materials and some may contain sealant materials. The ratio of these capsules may be varied as the need demands. It is also contemplated that the capsules may contain different materials which are inert when separated but which will react when combined, as would happen when the capsules are broken, to yield a different product, such as a foam which would seal an injury in the tire or a gas which would partially re-inflate the tire. It is also contemplated that the capsules may contain one of the reactive materials with the other material located in the inflation chamber, on the inner periphery of the tire or elsewhere, in such a position that the materials will come into contact when the tire is run-flat and the capsules broken.

These lubricant-sealant type materials may also contain materials which will expand upon heating so that they will generate some internal pressure in the tire after the capsule wall has been fractured. This feature will cause the tire to re-inflate to a certain degree giving added protection to prevent damage to the tire as a result of the tire being run-flat. If the tire is deflated due to an injury in the tire casing, it is envisioned that the sealant will plug the injury and that the heat generated by the tire running flat will cause the expansion of this part of the lubricant-sealant material which will result in a partial re-inflation of the tire.

FIG. 3 represents the tire-rim-capsule combination of this invention wherein the air pressure has been lost in the air chamber of the tire and it is in its run-flat condition. FIG. 3 depicts the tire of FIG. 1 in such a condition. In FIG. 3 the capsules 30 have been broken yielding the lubricant-sealant material 32. This material has been distributed by the centrifugal force of the tire over the inner periphery of the tire which will come in contact with other parts of the tire upon deflation. These areas of the inner periphery are depicted at locations B in FIG. 3. The lubricant-sealant material thereby mitigates the frictional heat generated when these portions of the inner periphery of the tire rub on one another.

The construction of this invention is applicable to all size tires, whether they be for passenger or truck vehicles. The number of capsules placed in the tire is dependent upon the size of the tire. It is necessary that a sufficient amount of the capsules be provided to completely coat the areas of the tire which come into contact with other areas of the tire when the tire is being run-flat.

I claim:

1. A pneumatic tire-rim combination wherein the inflation chamber defined by said tire and rim contains a plurality of free-floating capsules, said capsules having a thin-walled outer shell capable of withstanding the ambient conditions within the inflation chamber, said shell encloses a lubricant-sealant material so that said capsules will remain integral when the tire is operating under normal conditions but will break when the tire is run-flat thereby releasing said lubricant-sealant material to protect said tire from damage as a result of being run-flat.

2. The combination of claim 1 wherein said capsules contain a lubricant selected from the group consisting of a silicone derivative, a mica material, graphite material, a soap base material, a glycol or glycerine, and a sealant selected from the group consisting of asbestos material and a fiberous material.

* * * * *